United States Patent [19]

Yoshimoto et al.

[11] Patent Number: 4,761,662
[45] Date of Patent: Aug. 2, 1988

[54] IMAGE FORMING APPARATUS COMPRISING AN IMAGE BEARING MEMBER DRIVEN AT A PREDETERMINED CONSTANT SPEED

[75] Inventors: Toshio Yoshimoto, Tokyo; Kiyoshi Kanaiwa, Kawasaki; Kenjiro Hori, Yokohama; Yukihide Ushio; Hiroshi Hashimoto, both of Tokyo; Kaoru Seto, Chigasaki, all of Japan

[73] Assignee: Canon Kabushiki Kaisha, Tokyo, Japan

[21] Appl. No.: 896,638

[22] Filed: Aug. 15, 1986

[30] Foreign Application Priority Data

Aug. 20, 1985 [JP] Japan ................................. 60-182650

[51] Int. Cl.⁴ ............................................. G01D 9/42
[52] U.S. Cl. .................................... 346/108; 346/160; 358/296
[58] Field of Search ................. 346/108, 107 R, 76 L, 346/160, 136, 138; 358/296, 300, 302

[56] References Cited

U.S. PATENT DOCUMENTS 3,656,041  4/1972  Bonanzo ............................ 346/136
3,795,013  2/1974  McKinley .......................... 358/296
4,560,995  12/1985 Suga .................................. 346/136

Primary Examiner—E. A. Goldberg
Assistant Examiner—Mark Reinhart
Attorney, Agent, or Firm—Fitzpatrick, Cella, Harper and Scinto

[57] ABSTRACT

A movable image bearing member is provided with marks for detecting a moving speed of the image bearing member. A sensor detects the speed of movement of the marks. The signal as a result of the detection is compared with a reference signal to determine a phase difference therebetween. A driving motor for driving the image bearing member is controlled to remove the phase difference. Thus, the actual speed of the image bearing member is directly detected, and the speed is controlled so that the moving speed of the periphery of the image bearing member concerned with the image formation is accurately controlled.

27 Claims, 4 Drawing Sheets

IMAGE FORMING APPARATUS COMPRISING AN IMAGE BEARING MEMBER DRIVEN AT A PREDETERMINED CONSTANT SPEED

FIELD OF THE INVENTION AND RELATED ART

The present invention relates to an image forming apparatus, such as a copying apparatus, a laser beam printer and a multi-stylus printer, which is provided with an image bearing member movable along an endless path, more particularly to such an image forming apparatus provided with a mechanism for controlling a speed of the image bearing member movement.

In an image forming apparatus wherein an image (a latent image and/or a visualized image) is formed on an image bearing member which is movable along an endless path, it is required that the speed of the movement of the surface of the image bearing member is maintained at a predetermined speed. If the surface speed is different from the predetermined speed, or if the surface speed is not uniform, the image formed on the image bearing member is contracted or expanded, whereby the formed image is distorted.

FIG. 1 illustrates a conventional mechanism to avoid this. In this mechanism, a photosensitive drum (the image bearing member) 1 is driven by a motor 2. The photosensitive drum 1 is provided with a gear 3 fixed thereto, while on the other hand, the rotational shaft of the motor 2 is provided with a gear 4 fixed thereto. The gears 3 and 4 are meshed, thus the photosensitive drum 1 is operatively connected to the motor 2. An encoder 5 is mounted to the output shaft of the motor 2. The rotational speed of the encoder 5 is detected by a sensor 6. Pulse signals 7 corresponding to the rotation of the motor 2 detected by the sensor 6 is transmitted to a control device (not shown), which controls the motor 2 so that the frequency of the pulse signals 7 is equal to a reference frequency, whereby the rotational speed of the motor 2 is maintained constant.

By this mechanism, what is achieved is only to maintain constant the rotational speed of the "motor output shaft", and therefore, in the case where an axis of the shaft of the photosensitive drum is offset from the center of the photosensitive drum, that is, where an eccentricity exists, or where the surface of the drum is deformed, the speed of the surface of the photosensitive drum is not stabilized or not constant. Even if there is no such an eccentricity, the unstable surface speed results from an eccentricity and/or deformation of the gears 3 and 4 which transmit the driving force from the motor to the photosensitive drum.

It has been found that this problem is particularly remarkable in an image forming apparatus of a digital recording type such as a laser beam printer, further particularly when the image recording speed is increased, since the problem leads to image deterioration and resolution deterioration.

FIG. 2 illustrates a prior art structure which is intended to prevent the image deterioration caused by the non-uniform surface speed of the photosensitive drum, disclosed in Japanese Laid-Open Patent Application No. 42515/1984. In this structure, a laser beam L is produced by a laser source 19 and is introduced to the surface of the photosensitive drum 1 by way of a rotational polygonal mirror 18, a lens 20 and other necessary means to scan the surface. Ghost light L2 produced by the polygonal mirror illuminates code marks 21. The change in the reflective index by illuminating the code marks is detected by a photoelectric transducer element 22. The element 23 is a light deflector to deflect the beam in the direction indicated by an arrow D2.

Thus, the non-uniform speed of the photosensitive drum is detected, and in response to the detected non-uniform speed, the position of the laser beam scanning the photosensitive drum is controlled. As will be understood, the provision of the light deflector 23 is necessiated in order to deflect the laser beam in the direction D2. Additionally, the deflection must be very accurate, and therefore, it is expensive with the disadvantage that the response property of the light deflector is not satisfactory.

Furthermore, since the surface speed of the drum is not controlled but is allowed to change so that the scanning spot of the laser beam changes, the sharpness of the image formed by those spots is degraded.

SUMMARY OF THE INVENTION

Accordingly, it is a principal object of the present invention to provide an image forming apparatus wherein the moving speed of the image bearing member is maintained constant at a predetermined speed.

It is another object of the present invention to provide an image forming apparatus wherein such a speed can be maintained even when there is some distortion in the transmission mechanism for transmitting the driving force from the motor to the image bearing member.

It is a further object of the present invention to provide an image forming apparatus wherein such a speed can be maintained constant even when the image bearing member is eccentric.

It is a further object of the present invention to provide an image forming apparatus wherein an image is accurately formed on the image bearing member.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENT

Figure 1:
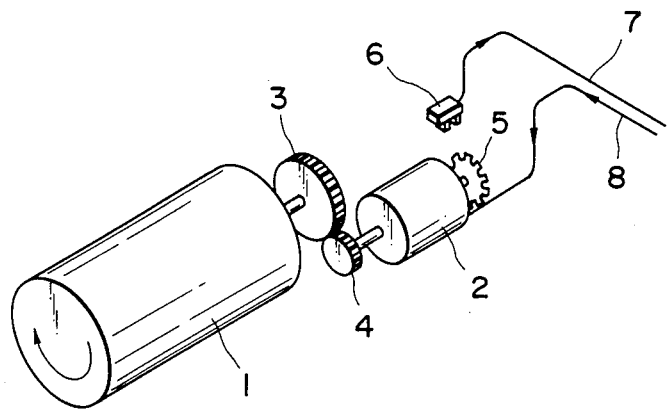
FIG. 1 is a perspective view of a conventional image forming apparatus.
Figure 2:
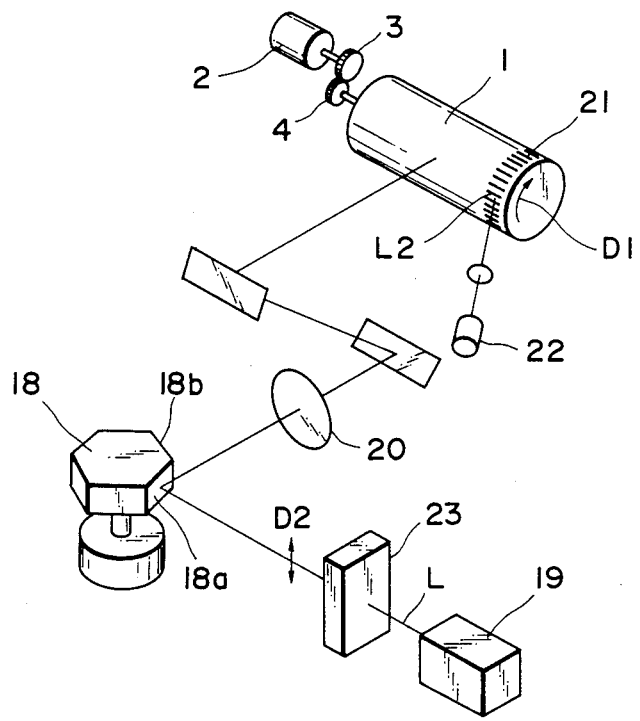
FIG. 2 is a perspective view of another prior art image forming apparatus.
Figure 3:
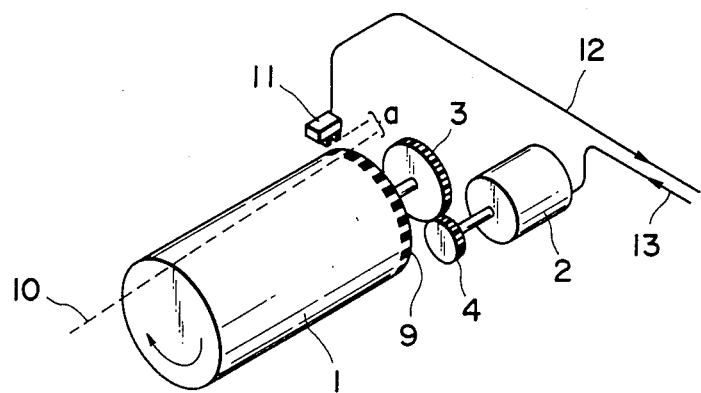
FIG. 3 is a perspective view of an image forming apparatus according to an embodiment of the present invention.

For understanding of the features of the present invention, reference is made to the accompanying drawings wherein like reference numerals have been used in the several views to describe the corresponding elements. Referring now to FIG. 3, there is shown an image forming apparatus according to an embodiment of the present invention. A photosensitive drum is movable or rotatable along an endless path in a direction indicated by an arrow and is provided with a photosensitive surface layer on which an electrostatic latent image is formed in the manner known in this technical field. The photosensitive drum 1 is the image bearing member, but another type of image bearing member may be used, such as having an insulating layer on the photosensitive layer. Another example is a member having a dielectric layer on a metal base. The image bearing member is not necessarily in the form of a drum but may be in the form of a belt, which is movable along an endless path. The photosensitive drum 1 is driven through gears 3 and 4 by a motor 2.

On a peripheral surface of the photosensitive drum 1 adjacent a longitudinal end thereof, a plurality of marks 9 are provided which extends all around the drum. The marks 9 are used to sense the surface or peripheral speed of the photosensitive drum 1. The marks 9 may be formed on a longitudinal end surface, but in that case, it is preferably be located adjacent or substantially at the same position as the drum periphery. From the standpoint of the accuracy of sensing the peripheral speed, it is preferable to provide the marks 9 on the photosensitive drum periphery. It is noted that the marks 9 are preferably protected from contamination, since otherwise the peripheral speed of the drum can not be accurately detected. With the view to this, it is preferable that the marks 9 are located in such an area as is not concerned with image formation, that is, in the non-image forming area. Further, it is noted that in some types of image forming apparatus, the image bearing member is uniformly charged electrically by a charger. Due to the electric charge applied by the charger, the image bearing member easily attracts dust, developer powder and/or other foreign matter. In view of this, it is preferable that the marks 9 are located at such a position as is not affected by to the charger.

Figure 4:
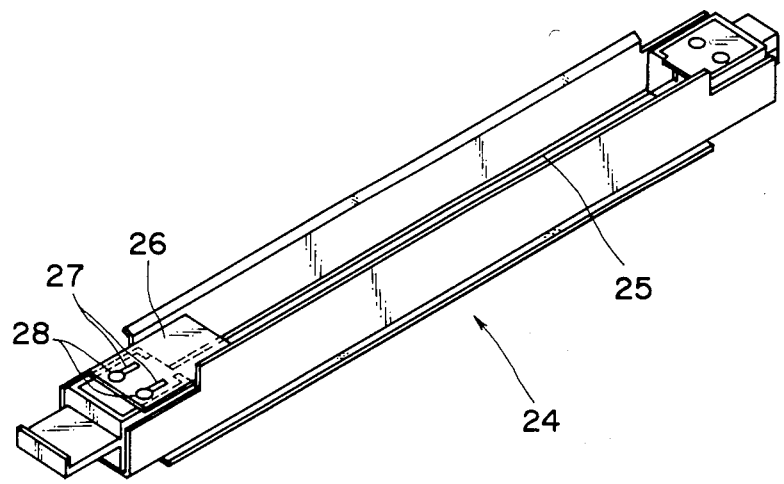
FIG. 4 is a perspective view of a corona charger usable with the image forming apparatus according to the embodiment of the present invention.

FIG. 4 is a perspective view of a corona discharger 24 usable as the charger and is suited for this purpose. The corona discharger 24 has a corona wire 25 and an insulating member 26 of Mylar or the like at an end portion to be opposed to the marks 9 on the surface of the photosensitive drum. The insulating member 26 is provided with an elongate slot 27. The insulating member 26 is slidable and fixed by a screw 28, whereby the shielding area in the longitudinal direction of the drum can be changed.

Opposed to the marks 9, there is provided a sensor 11 which may be a photosensor, a charge coupled device (CCD) or the like. The sensor 11 has an illuminating portion (not shown) for illuminating the marks and a reading portion for receiving the light reflected by the marks 9.

In this embodiment, the marks 9 have a regularly and alternately arranged bar code consisting of different reflective indexes. The amounts of the light detected by the sensor alternately change, and the sensor transduces the alternation to electric signals to provide one dimensional signals corresponding to the change in the amount of light. More particularly, corresponding to the code of the marks 9, the sensor 11 produces one dimensional sensor signals, and the sensor signals 12 are transmitted to a control device where the frequency of the sensor signals 12 is compared with a reference frequency, and a driving signal 13 is produced to the motor 2 so that the sensed frequency is equal to the reference frequency. Thus, the photosensitive drum 1 is rotated at a predetermined rotational speed.

Figure 5:
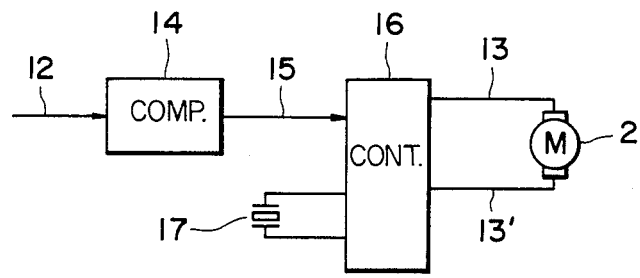
FIG. 5 is a block diagram illustrating a control of an image forming apparatus according to an embodiment of the present invention.

FIG. 5 is a block diagram to explain a circuit for controlling the rotational speed of the motor 2. The signals 12 transmitted from the photosensor 11 are reformed in the waveform by a comparator 14, and the reformed pulses 15 are transmitted to a controlling portion 16. To the controlling portion 16, an oscillating circuit 17 is connected to provide the controlling portion 16 with a reference frequency. The controlling portion 16 is effective to produce motor driving signals 13 and 13' to the motor 2 so as to provide a predetermined relation between the frequency of the reformed pulses 15 and the frequency provided by the oscillating circuit 17.

In this embodiment, the marks 9 are formed on the photosensitive drum 1, and the rotation of the photosensitive drum 1 is detected by the sensor 11. However, another means is usable if it is effective to the peripheral speed of the image bearing member, not the rotational speed of the rotational shaft. Additionally, the driving force transmitting system for transmitting the driving force from the driving source to the image bearing member may be of another type.

A description of the position of the sensor now will be provided.

It is recognized as being preferable that in order to form good image with high accuracy, the peripheral speed of the image bearing member is maintained at the predetermined speed in the image forming station as indicated by reference numeral 10 in FIG. 5. More generally, it is preferable that the speed is detected at or adjacent the image forming position. In the case where a charger and a developing device are provided around the image bearing member, an electrostatic latent image is formed at a position therebetween. Therefore, it is desirable that the peripheral speed of the photosensitive member is detected between the charger and the developing device. In FIG. 5, the sensor 11 is remote, by a distance a, from the image forming position 10. In this embodiment, the distance a corresponds to the delay between the production of the sensor signals 12 and the input of the driving signal 13. There is a time delay from the detection of the reflected light from the marks by the sensor to the control of the peripheral speed of the image bearing member, and therefore, it is preferable to detect the peripheral speed of the image bearing member at an upstream side of the image forming position.

Next, the description will be made with respect to the marks 9. The marks 9 are not limited to the marks as described hereinbefore, and may be plural projections which is detected by a microswitch engageable to the projection. The microswitch functions as the sensor in this case. From the standpoint of the accuracy of detection, the marks 9 using the difference in the refractive index are particularly preferable.

Further, the detecting accuracy is enhanced by forming the low reflective index portion and the high reflective index portion at the same level, that is, they are flat. More particularly, when they are not flat, that is, one of them is projected, the illuminating light reflects in an unintended direction, with the result that the sensor detects unwanted light, whereby the sensor produces improper signals. This disadvantage is eliminated by the flat structure so as to provide a reliable and stable detection of the speed. Additionally, it is desirable to enhance the accuracy that the marks provided portion of the image bearing member is flush with the unmarked portion. This is because if they are flush, the speed detected by the marks 9 is exactly corresponding to the peripheral speed of the image bearing member, and therefore, the very portion of the image bearing member concerned with the image formation is controlled in the moving speed.

To accomplish the flatness between the marks and the unmarked portion, it is desirable that the marks are manufactured simultaneously with the manufacture of the image bearing member.

It is further desirable that in the case of the image bearing member having a photosensitive layer, the marks are provided under the photosensitive layer, thus increasing the flatness, provided that the photosensitive layer is sufficiently transparent to allow the light to reach the marks and to allow the reflected light to pass through.

In this embodiment, the marks are located at such a side as is near the driving mechanism. This is preferable because the driving force from the motor is first transmitted to this side, and therefore, this location of the marks is preferable to make the response quick.

Figure 6:
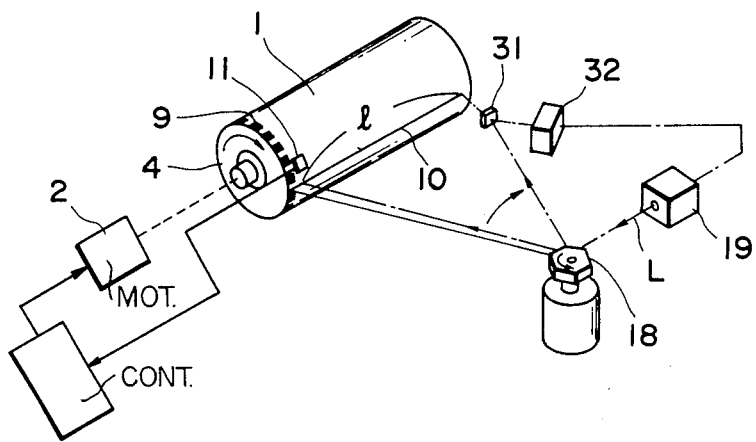
FIG. 6 is a perspective view of a laser beam printer according to an embodiment of the present invention.

FIG. 6 shows a laser beam printer according to an embodiment of the present invention. As described hereinbefore, in the laser beam printer wherein the recording is digital using the laser beam, the variation of the peripheral speed of the image bearing member is highly influential to the quality of the image. More particularly, the distance between beam spots can be expanded or contracted, so that the image quality is degraded. Therefore, the present invention is particularly effective to such a recording apparatus.

Referring to FIG. 6, a laser beam L modulated in accordance with the information to be recorded by the modulation signal generator 32, is produced by a laser source 19. The laser beam L is deflected by a rotational polygonal mirror 18 which is rotatable in a direction indicated by an arrow, so as to scan the photosensitive drum 1 in the longitudinal direction thereof. A sensor 11 is located adjacent a driven side of the photosensitive drum 1 and opposed to a non-image-forming area of the photosensitive drum surface which is outside the imaging area 1 and adjacent a longitudinal end of the drum.

The sensor 11 is so located as to be upstream of a beam detecting sensor 31 which will be described hereinafter, and upstream of the image forming position 10, with respect to the movement of the periphery of the photosensitive drum 1.

By the control described hereinbefore, the periphery of the photosensitive drum 1 is controlled to be constant.

The beam detecting sensor 31 is located such that it detects the laser beam L slightly outside the image forming area 1. When it detects the laser beam L, it produces an output. The signal is transmitted to a modulation signal generator 32, and in response thereto, the modulation signal generator 32 produces a modulation signal. By this, the starting position on each line of the image is aligned.

Figure 7:
FIG. 7 illustrates output signal of a sensor used with an embodiment of the present invention.

The laser beam L is so deflected that it positively illuminates the marks 9 provided outside the image forming area. Because of this arrangement, no particular light source is required to operate the sensor 11. In this case, the sensor 11 produces independent pulses, but actually, the polygonal mirror 18 rotates at a very high speed, and therefore, the intervals between adjacent pulses are very small as shown in FIG. 7, and as a whole, they constitute one dimensional signals.

In this case, it is preferable that the recording sheet or paper is fed with one lateral side aligned with a reference. It is further preferable that, the marks are formed at the reference side.

Figure 8:
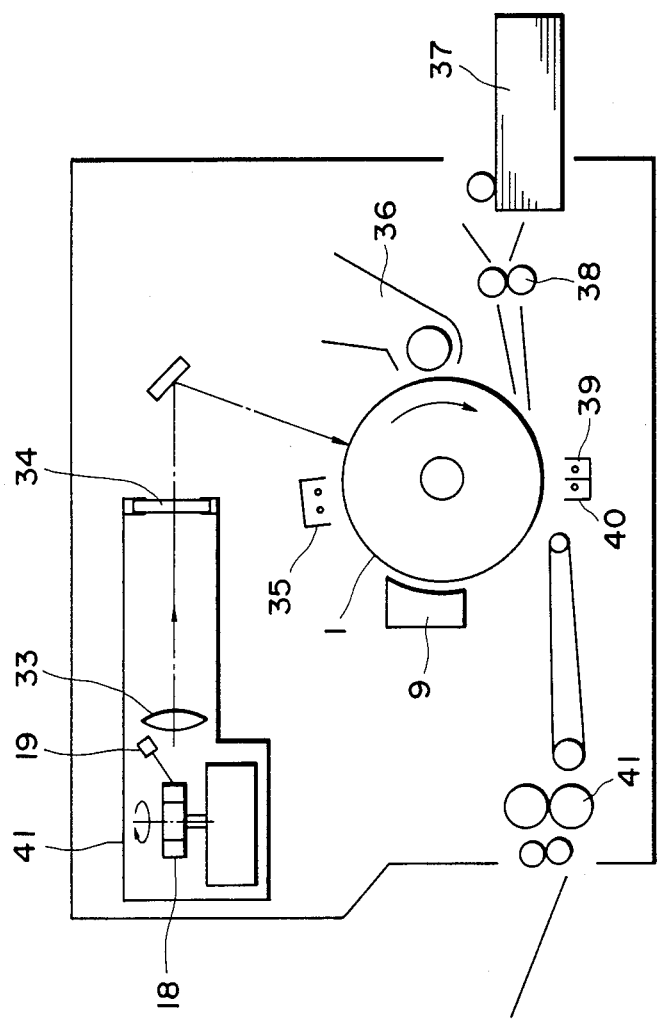
FIG. 8 is a sectional view of a laser beam printer according to an embodiment of the present invention.

FIG. 8 is a sectional view of the laser beam printer of FIG. 6. A housing 41 contains there the semiconductor laser 19, the polygonal mirror 18 and the imaging lens 33. At the outlet of the laser, there is provided a dust preventing glass 34 to prevent the optical member within the housing from being contaminated.

In operation, the photosensitive drum 1 is uniformly charged by a primary charger 35, and thereafter, is illuminated by the laser beam L, whereby the latent image to be recorded is formed. The latent image is visualized by the developing device 36. The recording sheet within the cassette 37 is fed to the photosensitive drum with timed relation with the image on the photosensitive drum by a registration roller 38. Then, the visualized image is transferred onto the recording sheet by the transfer charger 39. The recording sheet is separated from the photosensitive drum by a separation charger 40. Finally, the image is fixed on the recording sheet by the fixing device 40 and is discharged from the apparatus.

As described hereinbefore, according to the present invention, the beam spot which is the source of the image is uniform, so that sharp image is formed without distortion by a simple structure.

The appliction of the present invention is not limited to the laser beam printer, and is applicable to any image forming apparatus having an image bearing member which is movable along an endless path, as described hereinbefore.

The present invention covers any combination of the structure described in the foregoing.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus, comprising:
   an image bearing member movable along an endless path;
   image forming means for forming an image on said image bearing member;
   driving means for moving said image bearing member along the endless path;
   mark means formed on said image bearing member;
   detecting means for detecting a speed of movement of said image bearing member by movement of said mark means; and
   control means, responsive to said detecting means, for controlling said driving means to provide a predetermined constant speed of the movement of said image bearing member.

2. An apparatus according to claim 1, wherein said mark means is formed on a periphery of said image bearing member.

3. An apparatus according to claim 1, wherein said mark means is formed on a longitudinal end surface of said image bearing member.

4. An apparatus according to claim 2, wherein said mark means is formed in a non-image forming-area of said image bearing member.

5. An apparatus according to claim 1, wherein said image bearing member has a photosensitive layer, and wherein said image forming means includes charging means for uniformly charging said image bearing member, illuminating means for illuminating said image bearing member charged by said charging means with light bearing information to form a latent image on said image bearing member, and developing means for developing the latent image, wherein said detecting means detects the speed of said image bearing member between said charging means and said developing means.

6. An apparatus according to claim 1, wherein said detecting means is located at such a position as to detect the speed of said image bearing member at or upstream of an image forming position.

7. An apparatus according to claim 1, wherein said mark means includes portions having different reflective indexes which are arranged alternately.

8. An apparatus according to claim 7, wherein said detecting means includes a photoelectric transducer for transducing light to an electric signal.

9. An apparatus according to claim 7, wherein said mark means has a flat surface.

10. An apparatus according to claim 3, wherein said mark means is located at a side of said driving means.

11. An apparatus according to claim 1, wherein said mark means is integral with said image bearing member.

12. An apparatus according to claim 11, wherein said image bearing member include a photosensitive layer, and said mark means is disposed under the photosensitive layer.

13. A laser beam printer, comprising:
laser beam producing means for producing a laser beam modulated in accordance with image information;
a photosensitive member movable along an endless path;
charging means for uniformly charging said photosensitive member;
scanning means for scanning said photosensitive member which has been charged by said charging means, with the laser beam produced by said laser beam producing means;
driving means for driving said photosensitive member;
mark means formed on said photosensitive member;
detecting means for detecting a speed of movement of said photosensitive member by movement of said mark means; and
control means, responsive to said detecting means, for controlling the speed of said photosensitive member at a predetermined constant speed.

14. An apparatus according to claim 13, wherein said mark means is formed on a periphery of said photosensitive member.

15. An apparatus according to claim 13, wherein said mark means is formed on a longitudinal end surface of said photosensitive member.

16. An apparatus according to claim 15, wherein said mark means is formed in a non-image-forming area of said photosensitive member.

17. An apparatus according to claim 16, wherein said mark means is formed in an area of said photosensitive member which is not subjected to said charging means.

18. An apparatus according to claim 13, further comprising developing means for visualizing a latent image formed by the scanning of said scanning means, wherein said detecting means is so disposed as to detect the speed of said photosensitive member between said charging means and said developing means.

19. An apparatus according to claim 13, wherein said detecting means is so disposed as to detect the speed of said photosensitive member at or upstream of a position where said photosensitive member is scanned by said scanning means with respect to movement of said photosensitive member.

20. An apparatus according to claim 13, wherein said mark means includes portions having different reflective indexes which are arranged alternately.

21. An apparatus according to claim 20, wherein said detecting means includes a photoelectric transducer for transducing light to an electric signal.

22. An apparatus according to claim 20, wherein said mark means has a flat surface.

23. An apparatus according to claim 20, wherein said mark means is integral with said photosensitive member.

24. An apparatus according to claim 23, wherein said mark means is disposed under a photosensitive layer of said photosensitive member.

25. An apparatus according to claim 21, wherein said mark means is illuminated by the laser beam produced by said laser beam producing means, and wherein said detecting means detects the laser beam reflected by said mark means.

26. An apparatus according to claim 20, wherein said mark means is disposed in a non-image-forming area adjacent an end of said photosensitive member, and wherein an area where said mark means is provided is not subjected to a charging operation of said charging means.

27. An apparatus according to claim 15, wherein said mark means is provided at a side of said driving means.

* * * * *

UNITED STATES PATENT AND TRADEMARK OFFICE
CERTIFICATE OF CORRECTION

PATENT NO. : 4,761,662                            Page 1 of 3
DATED     : August 2, 1988
INVENTOR(S) : Yoshimoto, et al.

It is certified that error appears in the above-identified patent and that said Letters Patent is hereby corrected as shown below:

AT [56] IN THE REFERENCES

"Bonanzo" should read --Bonzano--;
"Suga" should read --Suga et al.--.

COLUMN 1

Line 36, "is" should read --are--.

COLUMN 2

Line 10, "siated" should read --sitated--.

COLUMN 3

Line 12, "as having" should read --as one having--;
Line 25, "be" should be deleted.
Line 42, "to" should be deleted.
Line 63, "one dimen-" should read --one-dimen- --
Line 66, "one" should read --one--.

COLUMN 4

Line 22, "effective to" should read --responsive to--; and
Line 55, "is" should read --are--.

COLUMN 6

Line 3, "one dimensional" should read
    --one-dimensional--;

UNITED STATES PATENT AND TRADEMARK OFFICE
CERTIFICATE OF CORRECTION

PATENT NO. : 4,761,662

DATED : August 2, 1988

INVENTOR(S) : Yoshimoto, et al.

It is certified that error appears in the above-identified patent and that said Letters Patent is hereby corrected as shown below:

Line 6, "that," should read --that--;
    Line 9, "there" should read --therein--;
    Line 33, "appliction" should read --application--; and
    Line 39, "structure" should read --structures--.

COLUMN 7

Line 34, "include" should read --includes--.

COLUMN 8

Line 4, "An apparatus" should read
        --A laser beam printer--;

Line 7, "An apparatus" should read
        --A laser beam printer--;

Line 10, "An apparatus" should read
        --A laser beam printer--;

Line 13, "An apparatus" should read
        --A laser beam printer--;

Line 16, "An apparatus" should read
        --A laser beam printer--;

Line 22, "An apparatus" should read
        --A laser beam printer--;

Line 28, "An apparatus" should read
        --A laser beam printer--;

UNITED STATES PATENT AND TRADEMARK OFFICE
CERTIFICATE OF CORRECTION

PATENT NO. : 4,761,662

DATED : August 2, 1988

INVENTOR(S) : Yoshimoto, et al.

It is certified that error appears in the above-identified patent and that said Letters Patent is hereby corrected as shown below:

Line 31, "An apparatus" should read
    --A laser beam printer--;

Line 34, "An apparatus" should read
    --A laser beam printer--;

Line 36, "An apparatus" should read
    --A laser beam printer--;

Line 39, "An apparatus" should read
    --A laser beam printer--;

Line 42, "An apparatus" should read
    --A laser beam printer--;

Line 47, "An apparatus" should read
    --A laser beam printer--;

Line 53, "An apparatus" should read
    --A laser beam printer--.

Signed and Sealed this

Fourth Day of July, 1989

Attest:

DONALD J. QUIGG

*Attesting Officer*     Commissioner of Patents and Trademarks